United States Patent [19]
Sion et al.

[11] Patent Number: 5,660,039
[45] Date of Patent: Aug. 26, 1997

[54] INJECTION SYSTEM AND AN ASSOCIATED TRICOAXIAL ELEMENT

[75] Inventors: Martin Sion, Mantes La Jolie; Pierre Desclos, Vernon; Dominique Raymond, Houlbec Cocherel, all of France

[73] Assignee: Societe Europeenne de Propulsion, Suresnes, France

[21] Appl. No.: 332,875

[22] Filed: Nov. 1, 1994

[30] Foreign Application Priority Data

Nov. 3, 1993 [FR] France ............... 93 13056

[51] Int. Cl.⁶ ..................... F02K 9/52
[52] U.S. Cl. ..................... 60/258; 239/424
[58] Field of Search ............ 60/258, 740; 239/424, 239/425

[56] References Cited

U.S. PATENT DOCUMENTS

| | | | |
|---|---|---|---|
| 3,446,024 | 5/1969 | Lewis et al. | 60/258 |
| 3,488,951 | 1/1970 | Chamberlain et al. | 60/258 |
| 3,541,788 | 11/1970 | Schutz | 60/258 |
| 3,603,092 | 9/1971 | Paine | 60/258 |
| 3,611,722 | 10/1971 | Shick | 60/258 |
| 3,662,960 | 5/1972 | Mitchell et al. | 239/400 |
| 3,740,946 | 6/1973 | Welton et al. | 60/258 |
| 4,523,530 | 6/1985 | Kaminaka et al. | 239/424 |
| 4,621,492 | 11/1986 | von Pragenau | 60/258 |
| 5,097,666 | 3/1992 | Shekleton et al. | 60/740 |

FOREIGN PATENT DOCUMENTS

| | | |
|---|---|---|
| 0344463 | 12/1989 | European Pat. Off. . |
| 2644607 | 4/1978 | Germany . |

*Primary Examiner*—Michael Koczo
*Attorney, Agent, or Firm*—Weingarten, Schurgin, Gagnebin & Hayes LLP

[57] ABSTRACT

The present invention relates to an injector of tricoaxial structure comprising a body that is circularly symmetrical about an axis of symmetry, said body being provided with a plurality of injection elements having axes parallel to said axis of symmetry and passing through an injection wall fixed to said body and separating said injector from a combustion member to which it is coupled. According to the invention, each of said injection elements comprises a central injection channel fed with a second propellant and an annular injection slot surrounding said central channel and fed with a first propellant, an additional annular injection channel for the second propellant being formed by a space that exists around each injection element between its side wall and said injection wall, such that the sheet of first propellant flowing from said annular slot is engaged between the central jet and the outer sheet, each of which delivers the second propellant.

9 Claims, 4 Drawing Sheets

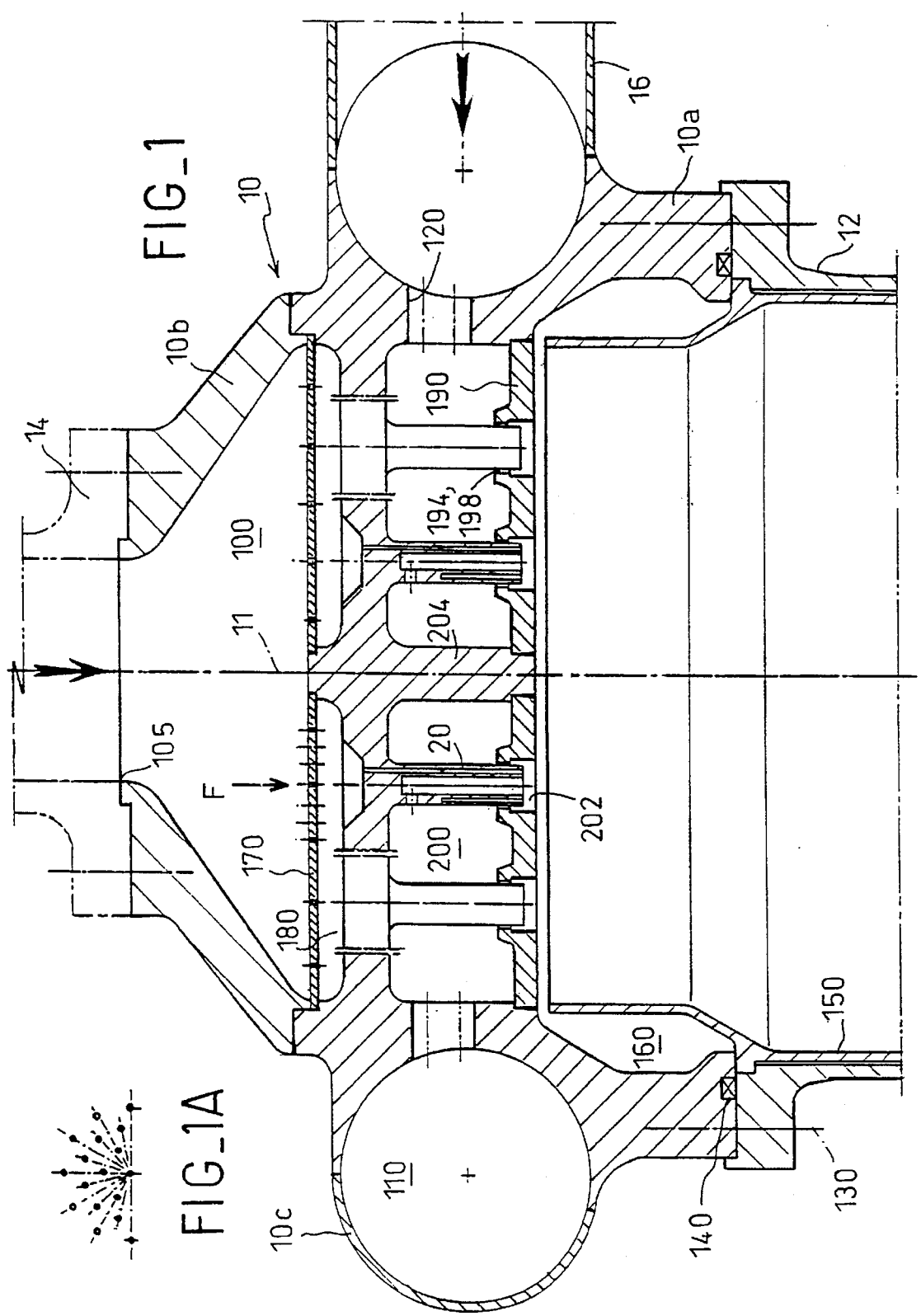

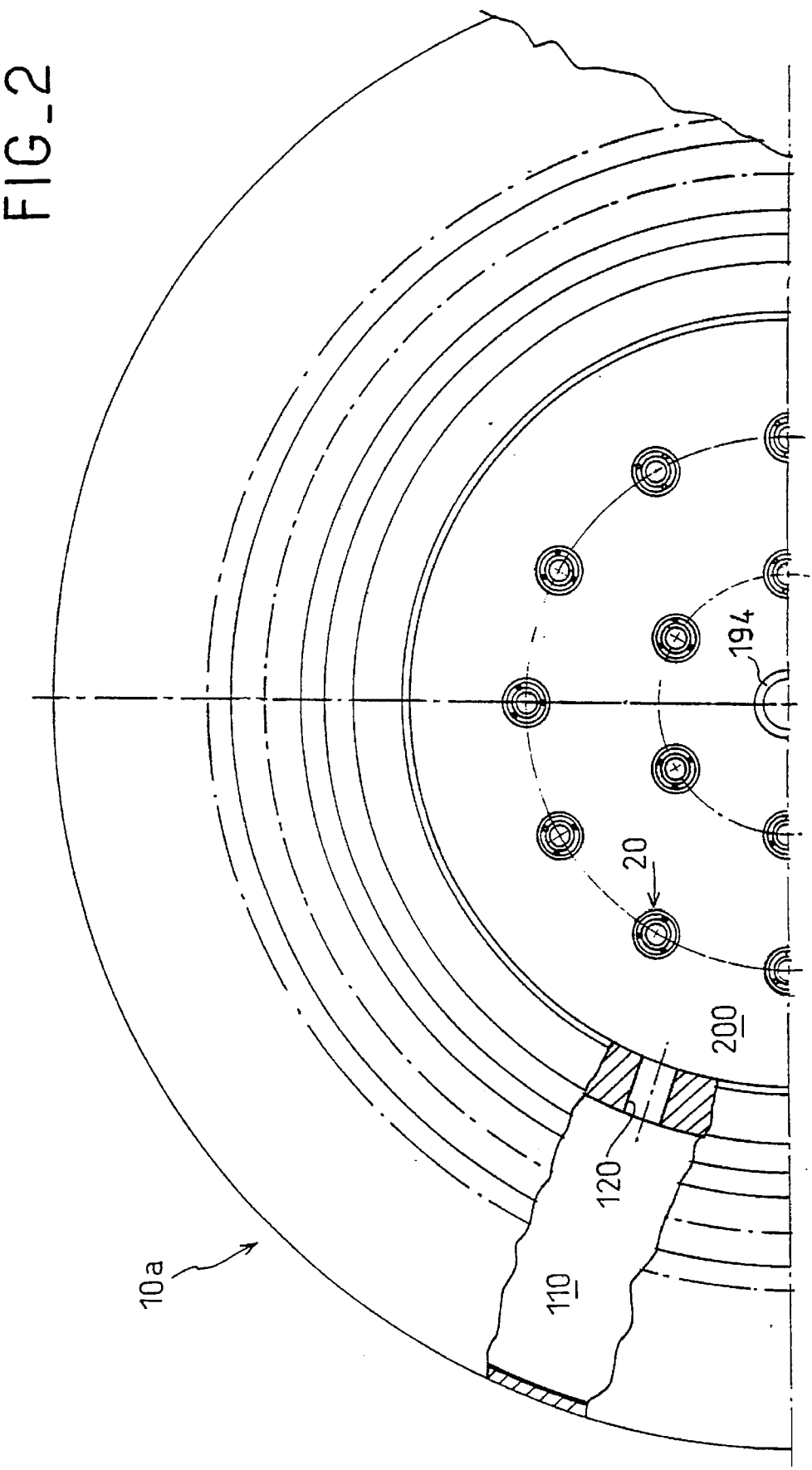

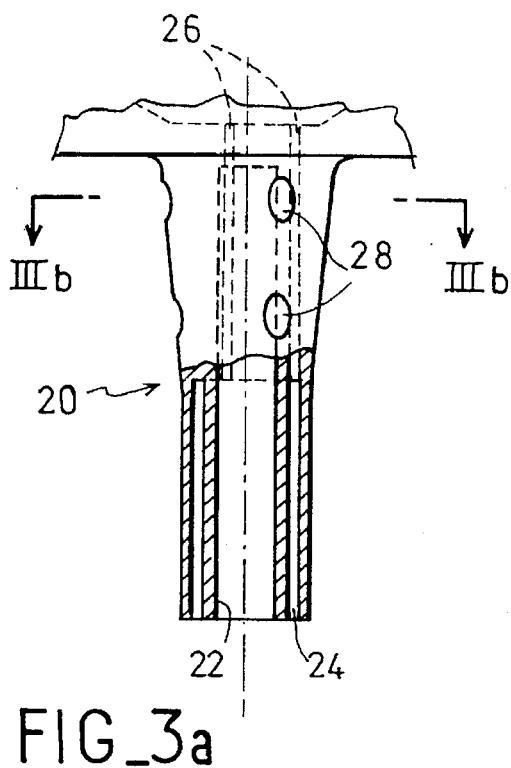
FIG_3a
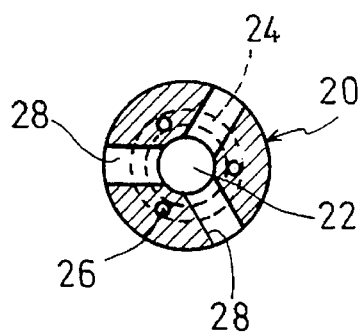
FIG_3b
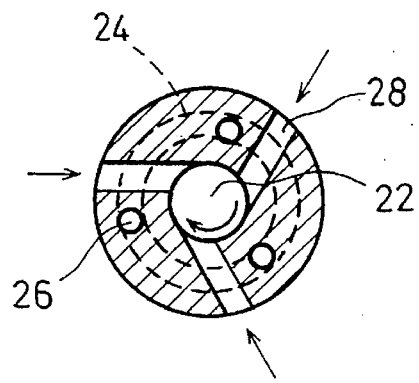
FIG_6a
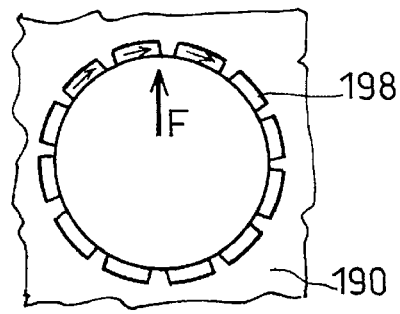
FIG_6b
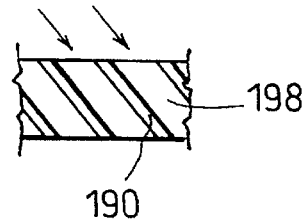
FIG_6c

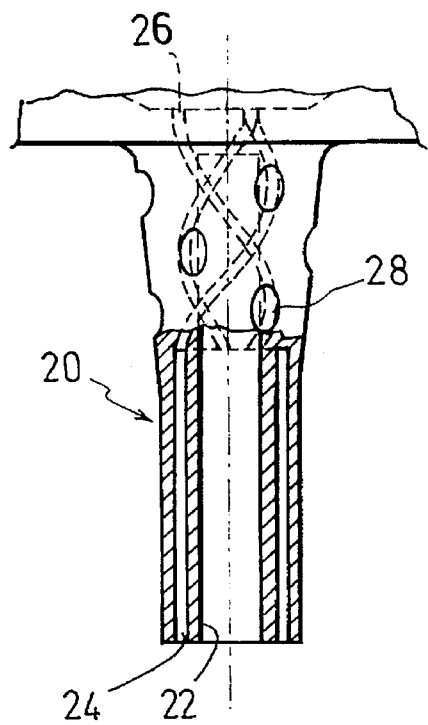
FIG_5
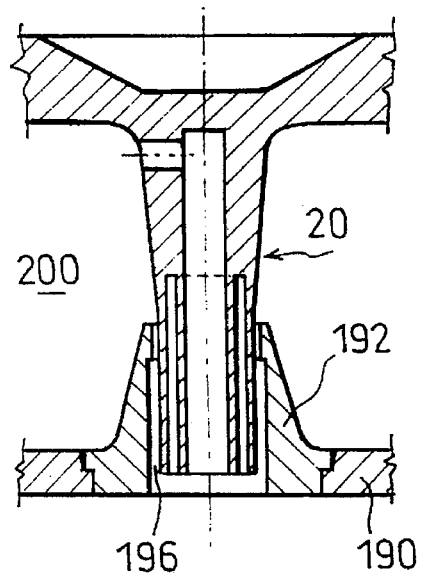
FIG_4a
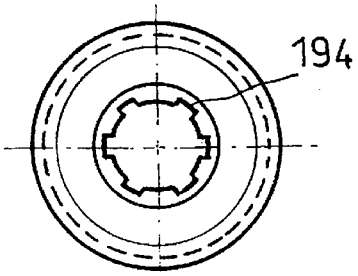
FIG_4b 5,660,039

INJECTION SYSTEM AND AN ASSOCIATED TRICOAXIAL ELEMENT

The present invention relates to an injection system (or injection head) and also to the associated injection elements of tricoaxial structure, the injector being designed for use in a large range of engines, in the combustion members of rocket engines such as the propulsive chamber proper or the combustion chambers of gas generators.

BACKGROUND OF THE INVENTION

An injector is a part comprising a plurality of injection elements (conventionally 50 to 100) enabling the combustion member to be fed with the propellant(s) necessary for operation thereof, and in such a manner that the propellants mix quickly and completely in order to ensure combustion that is stable and homogeneous.

For engines using cryogenic propellants, it is conventional to use injectors that have coaxial jet injection elements. However, such an injection system is not adapted to all operating conditions. In particular, it rapidly encounters its limits and fails to enable satisfactory results to be obtained whenever it is necessary to achieve high performance while injecting propellant at large flow rates. As a result, there is no hope of achieving significant cost savings using such a system.

U.S. Pat. No. 4,621,492 describes an injection configuration that makes it possible to envisage operating with large flow rates, in particular because it uses injection elements of annular structure enabling two coaxial jets to be formed adjacent to each other. However, the increase in injection flow rate is achieved to the detriment of combustion which is then no longer optimal, and above all the presence of liquid oxygen in the central body of the injection element considerably reduces the safety of the injector while increasing difficulties during development. Furthermore, such a structure does not simplify in any way the presently existing manufacturing problems due to the large number of parts making up an injector.

OBJECTS AND SUMMARY OF THE INVENTION

An object of the present invention is to mitigate the drawbacks of the prior art by implementing a novel injector architecture which ensures high performance even at large flow rates. Another object of the invention is to propose an injector that is simple, having a particularly small number of parts, thereby making it possible to reduce manufacturing costs compared with those of the prior art.

Yet another object of the invention is to obtain an injector that is reliable without any risk of creating leaks, which give rise to undesired mixing of propellants or to the formation of hot spots which themselves give rise to damage in the combustion member.

These objects are achieved by an injector of tricoaxial structure comprising a body that is circularly symmetrical about an axis of symmetry, said body being provided with a plurality of injection elements having axes parallel to said axis of symmetry and passing through an injection wall fixed to said body and separating said injector from a combustion member to which it is coupled, wherein each of said injection elements comprises a central injection channel fed with a second propellant and an annular injection slot surrounding said central channel and fed with a first propellant, an additional annular injection channel for the second propellant being formed by a space that exists around each injection element between its side wall and said injection wall, such that the sheet of first propellant flowing from said annular slot is engaged between the central jet and the outer sheet, each of which delivers the second propellant.

This simple geometrical configuration makes it possible to obtain a second propellant in the central jet and in an outer sheet that has no connection with the first propellant that flows in the intermediate sheet, thereby ensuring maximum safety for the injector. In addition, when the mixture is oxygen/hydrogen, the hydrogen is thus placed in the cavity closest to the combustion chamber against the injection wall which it can then serve to cool. Furthermore, the presence of a flow of oxygen between two flows of hydrogen makes it possible to create an internal flame front and an external flame front, thereby providing a temperature profile that is more homogeneous, thereby ensuring better combustion.

Each of said injection elements is fed with the first propellant from a first feed cavity disposed at the inlet to the injection elements and fed from a first propellant feed duct. Each of said injection elements is fed with the second propellant from a second feed cavity constituted by the space formed in the body around the injection elements and defined by said injection wall, said second cavity being fed perpendicularly to the axis of symmetry from a feed torus which is advantageously coupled coaxially to the body and which has a second propellant feed duct terminating therein.

Preferably, said first feed cavity is subdivided into two spaces of different sizes by a distribution plate, said first feed duct terminating in the first space and the second space opening out to the inlets of the injection elements, said plate including a plurality of series of holes made facing each of the injection elements, and through which the first propellant flows from the first space in which it has different speeds into the second space in which it has a speed that is practically zero.

By means of this architecture, turbulent dissipation is increased in the propellant which can then be brought up to the injection elements with a speed that is practically zero and that is identical for all of them, so as to avoid setting up different head losses at the various injection points, thereby guaranteeing a flow that is homogeneous and a flow rate of the propellant that is constant at each point of the injection element.

According to a particular feature of the invention, said injection elements pass part of the way through said injection wall, the free ends of said elements being set back from the external face of said injection wall, thereby forming respective confinement zones in which mixing of the propellants takes place.

By means of this confinement, the hydrogen (in an LH$_2$/LOX mixture) can retain all of its speed so as to enhance atomization of the propellant end thus ensure better combustion.

In a preferred embodiment, the injector of the invention includes eighteen injection elements disposed in two concentric rings, with the distances between pairs of successive injectors on the same ring being identical.

Advantageously, a liner may be disposed at an upstream end of the combustion member and may extend inside the body so as to create an annular space that opens towards the injection wall and that constitutes an integrated resonator for stabilizing combustion.

Each of the injection elements includes a central injection channel fed with a second propellant from a second feed cavity, and an annular injection slot surrounding said central channel and fed with a first propellant from a first feed cavity, the connection between the annular injection slot and the first feed cavity being provided via at least one calibration channel formed in the body of the injection element in a direction parallel to the axis of symmetry of said body, and the connection between the central injection channel and the second feed cavity being provided by at least one calibration channel formed in the body of the injection element along a direction perpendicular to the axis of symmetry of said body.

By means of this structure, the zone of mixing between the two propellants is increased (in particular in comparison with a conventional coaxial element operating at the same flow rate), and the length of the flame is reduced, thereby making it possible to achieve much better combustion efficiency. Further, when the first and second propellants are respectively oxygen and hydrogen, the presence of excess hydrogen in the center of the element makes it possible to achieve much better cooling of the combustion gases and to equalize their temperature profile, which is particularly advantageous for a gas generator in which it is important above all to obtain an outlet temperature that is as homogenous as possible. Also, by machining the channels through the solid mass, perfect sealing is guaranteed. Another advantage of this particular geometrical configuration is that the flow rate distribution between the central jet and the outer sheet can be set freely.

In a variant embodiment, the calibration channel for the first propellant has a curved path, which is advantageously helical, thereby making it possible to obtain mixing that is more thorough, and consequently to obtain better combustion characteristics. Similarly, the calibration channel for the second propellant may open out tangentially into said central channel in order to enable said second propellant to be injected with swirling motion.

Depending on the desired propellant flow rate, each injection element may include one or more calibration channels, said channels being uniformly distributed around the central channel, with it also being possible to superpose the calibration channels for the second propellant over a plurality of levels.

BRIEF DESCRIPTION OF THE DRAWINGS

Other characteristics and advantages of the present invention appear more clearly from the following description given by way of non-limiting example and made with reference to the accompanying drawings, in which:

FIG. 1 is a cross-section through an injection system of the invention;

FIG. 1A is a detail view of the FIG. 1 system as seen looking along arrow F;

FIG. 2 is a half-view of the underside of the central body of the FIG. 1 system;

FIGS. 3a and 3b show a first embodiment of a tricoaxial injection element of the invention;

FIGS. 4a and 4b are fragmentary views of an embodiment of the injection plate;

FIG. 5 shows a second embodiment of a tricoaxial injection element of the invention; and FIGS. 6a, 6b, 6c show variant embodiments of the FIG. 1 architecture.

DETAILED DESCRIPTION

FIG. 1 is a diametral section through an injection system of the invention. This system comprises a body of revolution 10 about an axis of symmetry 11 which is also the axis of circular symmetry of the combustion member 12 (e.g. a combustion chamber) with which the injection system is designed to be coupled. The body includes injection elements of tricoaxial structure, having axes parallel to the axis of symmetry, and each constituted by an annular slot fed with a first propellant surrounding a central orifice fed with a second propellant. These two injection channels are associated with a third channel for injecting the second propellant and constituted by an annular space surrounding the annular slot in such a manner that the sheet of first propellant coming from the first annular slot is engaged between two injections of the second propellant, said alternation of second propellant—first propellant—second propellant forming said tricoaxial structure.

In the preferred embodiment shown, the body 10 is made up of three distinct parts: a central part 10a including a determined number of injection elements 20 disposed concentrically around the axis of symmetry 11; a top part 10b overlying the central part and thereby constituting a feed cavity 100 for the first propellant, said cavity being fed with its propellant via a first feed duct 14 terminating in said cavity; and a circular pert 10c surrounding the central part end forming a feed torus 110 into which the second propellant is fed directly via a second feed duct 16.

The first cavity 100 is designed to homogenize the first propellant which penetrates into said cavity via a central admission orifice 105 formed at a top end of the cavity, on its axis of symmetry, end connected to the first feed duct 14. The torus 110 disposed around the central portion 10a of the body and fed with propellant by the second feed duct 16 opens inwardly into radial admission orifices 120 that are all of the same size and that are advantageously oblong in shape. These orifices, which are formed in the body 10 perpendicularly to its axis of symmetry end which extend radially, all open out into a second feed cavity 200 constituted by the space formed in the body around the injection elements end defined by an injection wall 190, and performing a homogenizing function for the second propellant, as for the first. The number of redial admission orifices 120 end their dimensions ere determined in such a manner that the injection elements are fed with the second propellant as homogeneously as possible.

The injection elements 20 are fed with the first propellant from the top end of each of said elements which opens out into the first feed cavity 100. In contrast, the same injection elements 20 are fed with the second propellant through the side walls of the elements where they pass through the second feed cavity 200.

Advantageously, the first feed cavity 100 includes a distribution grid or plate 170 placed slightly above the top ends of the injection elements 20 and defining within said cavity two spaces of different sizes, with the first propellant tending to be at identical pressure at all points within one of said spaces, given reference 180, and tending to have practically zero speed therein. To achieve this, the plate is pierced by multiple holes disposed in a determined uniform pattern (see FIG. 1A) immediately over each injection element, thereby achieving better propellant distribution and avoiding any preferred feeding, in particular to the central elements.

The central portion 10a of the body 10 which is in the form of a cup with the injection elements emerging from the bottom thereof (which elements may optionally be constituted by parts that are fitted in and individually welded to the body) is closed by the injection wall 190 whose external surface faces the combustion chamber 12. This wall is pierced by as many orifices as there are injection elements, and the injection elements engage therein in such a manner that the free ends of said elements are set back from the external face of the wall, thereby creating a space 202 in which mixing can be confined. The wall 190 is preferably fixed to the body 10 via a weld fillet, with a second welded connection to a central column 204 projecting from the body also serving to provide better support therefor. Facing each of the injection elements, the injection wall is provided with straight grooves 194 (or curved grooves 198 as described below) opening out into the space 202 to calibrate the flow rate of the outer sheet of the second propellant.

The unit comprising the body and the injection elements is preferably made by the known method of machining by electroerosion. This method avoids the need for any brazing and makes it possible, without difficulty, to achieve the various concentric dispositions required for proper operation of the injection system of the invention.

The injector is connected to the combustion member (e.g. a combustion chamber) in conventional manner by means of a flange 130 facing the bottom end of the body 10, with these two elements being assembled together in sealed manner, e.g. by means of a gasket 140 placed on the flange. It may be observed that it is equally possible to envisage welding them together. A liner 150 may be disposed at an upstream end of the combustion chamber, extending into the inside of the body 10 so as to establish an annular space 160 that is open towards the injection wall and that can act as an integrated resonator for stabilizing combustion.

The propellant is ignited by an igniter (not shown) placed directly in the combustion chamber 12 and which may be of a wide variety of types: e.g. explosive, electric torch, or acoustic torch.

FIG. 2 is a half-view of the underside of the central portion 10a of the body with a portion cut away to show one of the radial admission orifices 120 that provides communication between the feed torus 110 and the second feed cavity 200. In the example shown, the central body 10a includes eighteen injection elements (each having its axis parallel to the axis of symmetry 11) disposed concentrically in two rings, with the distance between two successive elements in the same ring being identical. Naturally, this number of elements is not limiting in any way, and it is possible to use a number that is smaller or larger depending on the required combustion characteristics.

FIGS. 3a and 3b show any one of the above-mentioned injection elements. The element 20 is in the form of a Pitot tube, which is advantageously circular in section, comprising: a central injection channel 22 extending substantially along the entire length of the Pitot tube and having a back end that is closed (and a front end that emerges into the injection wall); and an annular injection slot 24 surrounding said central channel, and extending over a fraction only of the length of the Pitot tube, with its back end likewise being closed (and with its front end emerging in the injection wall). The first propellant is brought to the blind slot 24 from the first feed cavity 100 (or from the homogenizing space 180) via calibration channels 26 that are formed in the Pitot tube, that have axes parallel to the axis of the Pitot tube, and that open out into the closed end of said slot, with the number and dimensions thereof being designed so as to provide the required head loss at some given flow rate of propellant. The second propellant is brought to the blind central channel 22 from the second feed cavity 200 via radial calibration channels 28 formed through the Pitot tube, which channels 28 are uniformly distributed and open out into said central channel 22. Depending on the intended propellant flow rate, one or more superposed levels of injection can be provided.

The injection system of the invention operates as follows. To clarify the explanation, it is assumed that the first propellant is liquid oxygen (LOX) and the second propellant is liquid hydrogen ($LH_2$). Naturally, other liquid propellants could also be considered. Similarly, the architecture described could perfectly well be used with gaseous hydrogen.

The liquid oxygen is injected into the body 10 from the feed duct 14 via the central orifice 105 and penetrates into the cavity 100 for homogenizing the speed thereof and from which it escapes via the various holes formed in the distribution plate 170. The holes are positioned in such a manner as to ensure that the flow of oxygen through each of them takes place at the same speed. The oxygen flows along these holes and thus arrives with practically zero speed at the inlets of the injection elements at the calibration channels 26. After passing along these channels, the oxygen penetrates into the annular slot 24 surrounding the central injection channel 22 (from which there escapes the liquid hydrogen whose circulation is described below), and the liquid oxygen escapes from the annular slot 24 in the form of a liquid sheet.

The liquid hydrogen penetrates into the torus 110 from the feed duct 16 and it leaves the torus via the radial channels 120 which open out into the central feed cavity 200 in which the speed of the hydrogen is homogenized over the entire surface of the injector prior to penetrating into each of the injection elements 20 firstly via the radial calibration channels 28 formed in the side wall thereof with the number and size of the radial channels being determined to ensure head loss that corresponds to a given propellant flow rate, and secondly via the calibration grooves 194, 198 formed in the injection wall (or in the ferrules brazed on said wall, as described below). The liquid hydrogen brought into the injection elements via the calibration channels 28 then penetrates into the central injection channel 22 of each of said elements, from which it escapes in a vertical jet that impacts against the internal face of the liquid oxygen sheet leaving via the annular slot 24 that surrounds each of said central injection channels. In parallel, the liquid hydrogen conveyed by the calibration grooves 194, 198 penetrates into the annular space 196 from which it flows out as a sheet that impacts this time against the external face of the sheet of liquid oxygen. This results in two flame fronts being created, an internal front and an external front, thereby making it possible to obtain a temperature profile that is very homogeneous.

FIGS. 4a and 4b show an embodiment of the injection wall 190 in the form of added-on ferrules 192 which are secured by brazing and which are centered on each of the Pitot tubes 20 by contact with the inside circle of each ferrule. The calibration grooves 194 formed in these ferrules parallel to the axis of the Pitot tube enable the desired calibration to be obtained for this new injection of the second propellant from the second cavity 200. This injection which takes place in an annular space 196 surrounding the Pitot tube creates an external sheet of propellant that encloses the first propellant, so that the first propellant is engaged between said external sheet and the central jet. It may be observed that this dual feed of the second propellant provides great freedom in establishing the distribution of flow rates between the central jet and the outer sheet.

When using $LOX/LH_2$, and given the different injection speeds required for those propellants (respectively about 10 meters per second (m/s) and 150 m/s), it can be advantageous, to cause the liquid oxygen to rotate in order to obtain better mixing. FIG. 5 shows an embodiment of an injection element in which the calibration channels 26 are formed to follow helical paths. Under such circumstances, it is important to observe that when the radial channels are present on a plurality of levels, they must naturally be formed so as to avoid intercepting the helical channels. The additional speed thus acquired by the liquid oxygen leaving the Pitot tube enhances fragmentation thereof by the liquid hydrogen and makes it possible to form the mixture closer to the injection wall.

If necessary, it is also possible to consider imparting rotation to the second propellant in addition to the first, thereby forming a mist that is more suitable for combustion. This swirling effect is achieved for the central jet by causing the calibration channels 28 to open out tangentially into the central channel 22 (see FIG. 6a), and for the outer sheet this is achieved by forming helical calibration grooves 198 in the injection plate (see FIGS. 6b and 6c).

With the architecture proposed, the operation of the injector of the invention is made more reliable. The risk of internal leaks bringing the two propellants into contact with each other is eliminated, and when using LH$_2$/LOX, the fact that the oxygen is totally surrounded by the hydrogen eliminates any danger of contact between hot oxygen and the separation walls of the chamber. In addition, and this constitutes an essential element, the resulting injector requires only a very small number of parts in its manufacture, with this number being less than ten (when the injection elements and the central portion of the body are made out of a single part), which is considerably smaller than the number required for any of the injectors presently manufactured using conventional techniques, since they require about a hundred parts (due essentially to numerous injection elements being made individually out of two parts each: the Pitot tube and a sleeve).

We claim:

1. An injector of tricoaxial structure comprising a body that is circularly symmetrical about an axis of symmetry, said body being provided with a plurality of injection elements having axes parallel to said axis of symmetry and passing through an injection wall fixed to said body and separating said injector from a combustion member to which it is coupled, wherein each of said injection elements comprises a central injection channel fed with a second propellant, said central injection channel in communication with a second feed cavity, and an annular injection slot surrounding said central channel and fed with a first propellant, said annular injection slot in communication with a first feed cavity, an additional annular injection channel in communication with the second feed cavity for the second propellant being formed by a space that exists around each injection element between its side wall and said injection wall, such that the sheet of first propellant flowing from said annular slot is engaged between the central jet and the outer sheet, each of which delivers the second propellant.

2. A tricoaxial injector according to claim 1, wherein each of said injection elements is fed with the first propellant from the first feed cavity disposed at the inlet to the injection elements and fed from a first propellant feed duct.

3. A tricoaxial injector according to claim 2, wherein said first feed cavity is subdivided into two spaces of different sizes by a distribution plate, said first feed duct terminating in the first space and the second space opening out to the inlets of the injection elements, said plate including a plurality of series of holes made facing each of the injection elements, and through which the first propellant flows from the first space in which it has different speeds into the second space in which it has a uniform reduced speed.

4. A tricoaxial injector according to claim 1, wherein each of said injection elements is fed with the second propellant from the second feed cavity constituted by the space formed in the body around the injection elements and defined by said injection wall, said second cavity being fed perpendicularly to the axis of symmetry from a feed torus which is advantageously coupled coaxially to the body and which has a second propellant feed duct terminating therein.

5. A tricoaxial injector according to claim 1, wherein said injection elements pass part of the way through said injection wall, the free ends of said elements being set back from the external face of said injection wall, thereby forming respective confinement zones in which mixing of the propellants takes place.

6. A tricoaxial injector according to claim 5, wherein said injection wall is constituted by a plate on which a plurality of ferrules are fixed, each being slidably centered on an injection element, each ferrule including internal grooves forming a calibration channel for the second propellant that is to be injected into the additional annular space existing between the ferrule and the side wall of the corresponding injection element.

7. A tricoaxial injector according to claim 6, wherein said injection wall or said ferrule includes helically shaped grooves so as to impart swirling motion to the second propellant.

8. A tricoaxial injector according to claim 1, wherein said injector includes eighteen injection elements disposed in two concentric rings, with the distances between pairs of successive injectors on the same ring being identical.

9. A tricoaxial injector according to claim 1, further including a liner disposed at an upstream end of the combustion member and extending inside the body so as to create an annular space that opens towards the injection wall and that constitutes an integrated resonator for stabilizing combustion.

* * * * *

UNITED STATES PATENT AND TRADEMARK OFFICE
CERTIFICATE OF CORRECTION

PATENT NO. : 5,660,039
DATED : August 26, 1997
INVENTOR(S) : Martin Sion, et al.

It is certified that error appears in the above-identified patent and that said Letters Patent is hereby corrected as shown below:

Column 4,
Line 22, "pert" should read -- part --;
Line 23, "end" should read -- and --;
Line 28, "end" should read -- and --;
Line 34, "end" should read -- and --;
Line 37, "end" should read -- and --;
Line 39, "redial" should read -- radial --;
Line 39, "end" should read -- and --;
Line 40, "ere" should read -- are --.

Signed and Sealed this

Twenty-sixth Day of February, 2002

*Attest:*

JAMES E. ROGAN
*Attesting Officer*   *Director of the United States Patent and Trademark Office*